US009245126B2

(12) United States Patent
Christodorescu et al.

(10) Patent No.: US 9,245,126 B2
(45) Date of Patent: Jan. 26, 2016

(54) PROTECTION OF USER DATA IN HOSTED APPLICATION ENVIRONMENTS

(71) Applicant: International Business Machines Corporation, Armonk, NY (US)

(72) Inventors: Mihai Christodorescu, Briarcliff, NY (US); Dimitrios Pendarakis, Westport, CT (US); Kapil K. Singh, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/677,457

(22) Filed: Nov. 15, 2012

(65) Prior Publication Data

US 2014/0137181 A1 May 15, 2014

Related U.S. Application Data

(63) Continuation of application No. 13/675,383, filed on Nov. 13, 2012, now Pat. No. 9,098,709.

(51) Int. Cl.

| G06F 17/00 | (2006.01) |
|---|---|
| G06F 21/60 | (2013.01) |
| G06F 21/53 | (2013.01) |
| H04L 29/06 | (2006.01) |

(52) U.S. Cl.
CPC ............. *G06F 21/60* (2013.01); *G06F 21/53* (2013.01); *H04L 63/10* (2013.01)

(58) Field of Classification Search
CPC .......... G06F 21/53; G06F 21/60; H04L 63/10
USPC ........... 713/166, 201; 726/1, 26, 27, 4, 22, 25
See application file for complete search history.

(56) References Cited

U.S. PATENT DOCUMENTS

| 5,261,095 | A | 11/1993 | Crawford et al. | |
|---|---|---|---|---|
| 6,526,513 | B1 | 2/2003 | Shrader et al. | |
| 7,123,974 | B1* | 10/2006 | Hamilton ........... | G05B 19/4063 700/17 |
| 7,374,099 | B2* | 5/2008 | de Jong ................ | G06Q 20/341 235/380 |
| 7,536,548 | B1* | 5/2009 | Batke et al. ................... | 713/166 |
| 7,630,986 | B1* | 12/2009 | Herz ...................... | G06Q 10/10 1/1 |
| 8,155,146 | B1* | 4/2012 | Vincent et al. ................ | 370/473 |
| 8,190,888 | B2* | 5/2012 | Batke et al. ................... | 713/166 |
| 8,261,258 | B1 | 9/2012 | Jianu et al. | |
| 2005/0120242 | A1* | 6/2005 | Mayer et al. ............ | G06F 21/56 726/4 |

(Continued)

OTHER PUBLICATIONS

Stefan Berger, "TVDc: Managing Security in the Trusted Virtual Datacenter", ACM SIGOPS Operating Systems Review, vol. 42-Issue 1, Jan. 2008, pp. 40-47.

(Continued)

*Primary Examiner* — Thu Ha Nguyen
(74) *Attorney, Agent, or Firm* — F. Chau & Associates, LLC

(57) ABSTRACT

A method of converting an original application into a cloud-hosted application includes splitting the original application into a plurality of application components along security relevant boundaries, mapping the application components to hosting infrastructure boundaries, and using a mechanism to enforce a privacy policy of a user. The mapping may include assigning each application component to a distinct virtual machine, which acts as a container for its assigned component.

14 Claims, 8 Drawing Sheets

(56) References Cited

U.S. PATENT DOCUMENTS

| | | | |
|---|---|---|---|
| 2007/0083933 A1* | 4/2007 | Venkatapathy | G06F 21/577 726/25 |
| 2009/0183263 A1 | 7/2009 | McMichael et al. | |
| 2009/0222885 A1* | 9/2009 | Batke et al. | 726/1 |
| 2009/0235324 A1 | 9/2009 | Griffin et al. | |
| 2009/0249489 A1* | 10/2009 | Livshits et al. | 726/26 |
| 2010/0010767 A1 | 1/2010 | Shipton et al. | |
| 2011/0173405 A1* | 7/2011 | Grabarnik | G06F 11/1464 711/162 |
| 2011/0277038 A1* | 11/2011 | Sahita et al. | 726/27 |
| 2012/0084078 A1* | 4/2012 | Moganti et al. | 704/201 |
| 2012/0250682 A1* | 10/2012 | Vincent | H04L 12/4633 370/390 |
| 2012/0250686 A1* | 10/2012 | Vincent et al. | 370/392 |
| 2014/0137181 A1* | 5/2014 | Christodorescu | G06F 21/53 726/1 |
| 2014/0331317 A1* | 11/2014 | Singh | G06F 21/52 726/22 |

OTHER PUBLICATIONS

International Search Report dated Oct. 10, 2013 corresponding to PCT/US13/64023.
US Notice of Allowance dated Mar. 19, 2015 for U.S. Appl. No. 13/675,383.
Zheng et al., "Using Replication and Partitioning to Build Secure Distributed Systems", IEEE Conference, 2003, pp. 1-15.
US OA dated Nov. 5, 2014 for U.S. Appl. No. 13/675,383.

* cited by examiner

PROTECTION OF USER DATA IN HOSTED APPLICATION ENVIRONMENTS

CROSS-REFERENCE TO RELATED APPLICATIONS

This application is a continuation of U.S. application Ser. No. 13/675,383 filed on Nov. 13, 2012, the disclosure of which is incorporated by reference herein.

BACKGROUND

1. Technical Field

The present disclosure relates to protection of user data in hosted application environments.

2. Discussion of Related Art

A multitude of services and applications are presently hosted on a third party infrastructure (e.g., in the cloud). For example, an individual can use a client program on their local computer (e.g., a personal computer, tablet, smartphone, etc.) to interact with a hosted application to edit and store their personal documents. However, it can be difficult to ensure the privacy of this data since many entities may have access to underlying components of the hosted application. The user of the hosted application has to make a trust determination about the application developer and the hosting provider. However, it can be difficult to make these determinations since the information needed to make a proper assessment may be unavailable.

Currently, hosted applications are monolithically installed in the hosting infrastructure. While this can successfully isolate the applications from one another, it provides virtually no control over the communication between applications or communication with external entities. As a result, once applications have access to a user's private data, they are free to share this information with anyone. The primary reason for third-party hosting, to hide the complexity of managing and scaling computational resources, also serves to hide the structure of any hosted application or service. Thus, a user who would need to review the internals of both the hosting infrastructure and the application of interest to determine their combined trustworthiness is left in the dark. However, if the hosting infrastructure and applications can be fortified, it is not necessary for the user to make these trust determinations.

Accordingly, there is a need for methods and systems that can better protect user data in hosted application environments.

BRIEF SUMMARY

According to an exemplary embodiment of the invention, a method of converting an original application into a cloud-hosted application includes splitting the original application into a plurality of application components along security relevant boundaries, mapping the application components to hosting infrastructure boundaries, and using a mechanism to enforce a privacy policy of a user. The mapping may include assigning each application component to a distinct virtual machine, which acts as a container for its assigned component.

According to an exemplary embodiment of the invention, a method of managing a cloud-hosted application including a plurality of application components includes starting a new virtual machine for each application component, wherein each virtual machine runs a distinct one of the application components, sending, by one of the virtual machines, a message to a user requesting permission for information to be output to an external application, updating a privacy policy of the user based on a response of the user to the message, and outputting the information to the external application only when the privacy policy indicates that output of the information to the external application is allowed.

According to an exemplary embodiment of the invention, a method of managing a cloud-hosted application including a plurality of application components includes starting a new virtual machine for each application component, wherein each virtual machine runs a distinct one of the application components, receiving a manifest from an external application indicating required information, sending a message to a user requesting permission for the information and an identity of the external application, and outputting the information to the external application only when a response to the message by the user indicates that output of the information to the external application is allowed.

According to an exemplary embodiment of the invention, a system configured to convert an original application into a cloud-hosted application includes a memory storing a computer program and a processor configured to execute the program. The program is configured to split the original application into a plurality of application components along security relevant boundaries, map the application components to hosting infrastructure boundaries, and use a mechanism to enforce a privacy policy of a user.

According to an exemplary embodiment of the invention, a system configured to manage a cloud-hosted application including a plurality of application components includes a memory storing a computer program and a processor configured to execute the program. The program is configured to start a new virtual machine for each application component. Each virtual machine runs a distinct one of the application components. At least one of the application components sends a message to a user requesting permission for information to be output to an external application, updates a privacy policy of the user based on a response of the user to the message, and outputs the information to the external application only when the privacy policy indicates that output of the information to the external application is allowed.

According to an exemplary embodiment of the invention, a system configured to manage a cloud-hosted application including a plurality of application components, includes a memory storing a computer program and a processor configured to execute the program. The program is configured to start a new virtual machine for each application component. Each virtual machine runs a distinct one of the application components. At least one of the virtual machines receives a manifest from an external application indicating required information, sends a message to a user requesting permission for the information and an identity of the external application, and outputs the information to the external application only when a response to the message by the user indicates that output of the information to the external application is allowed.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Figure 1:
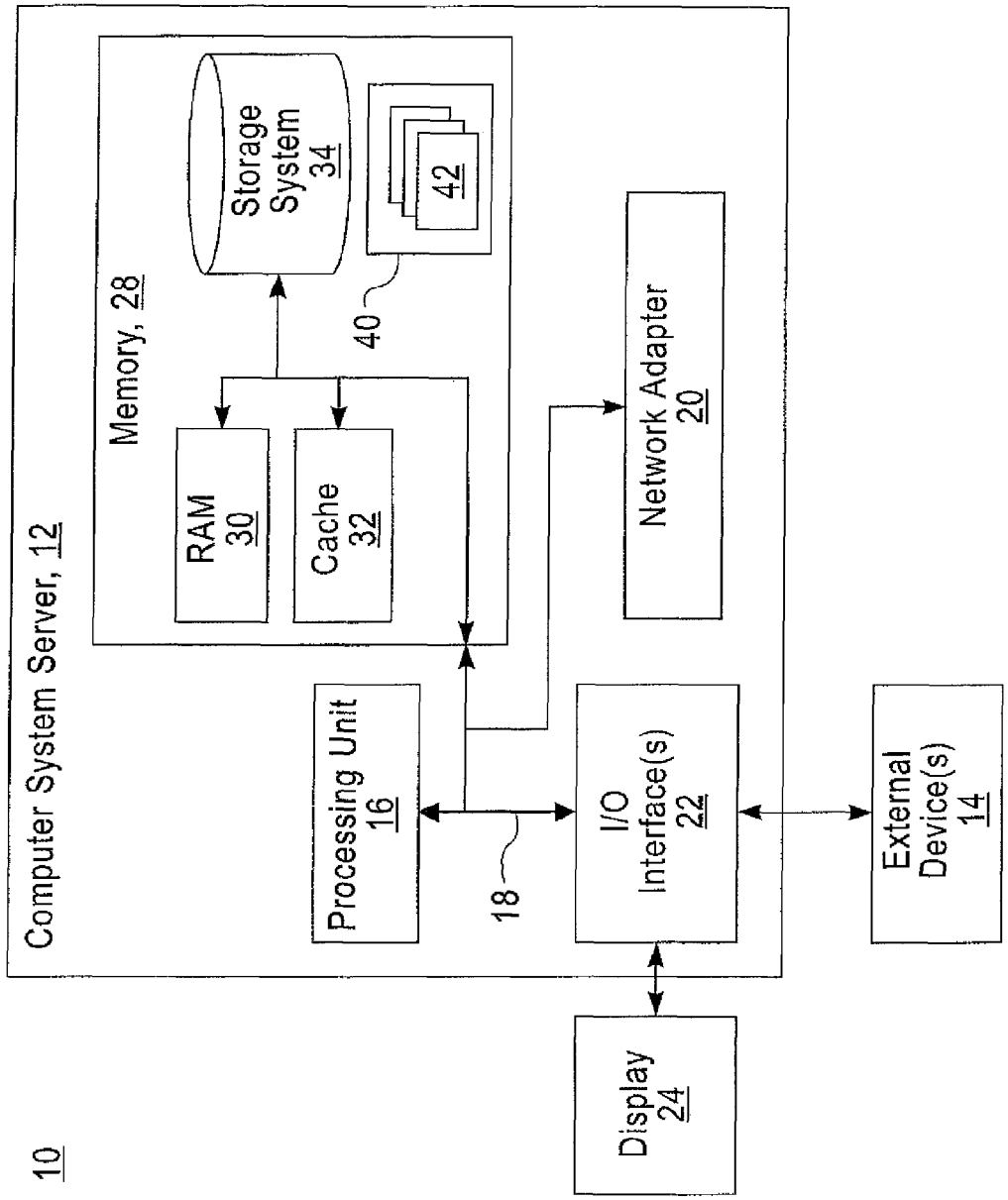
FIG. 1 depicts a cloud computing node according to an exemplary embodiment of the present invention.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
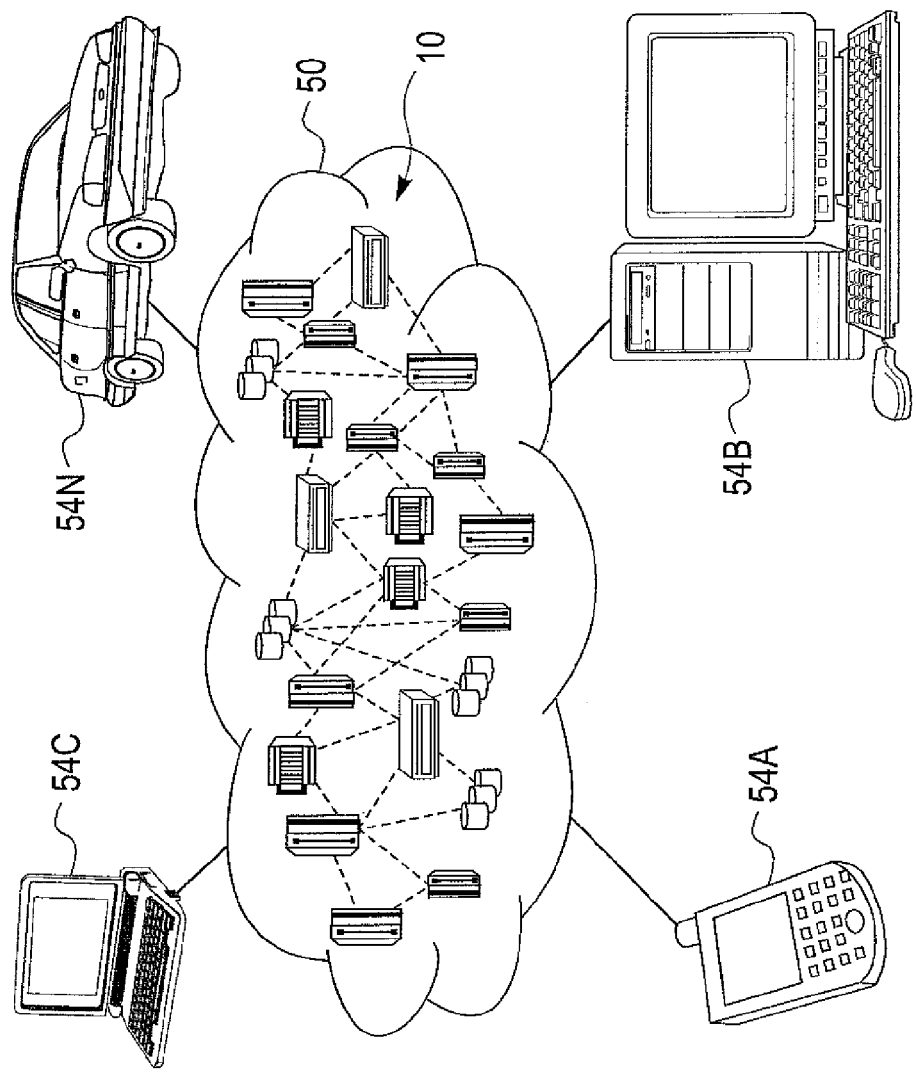
FIG. 2 depicts a cloud computing environment according to an exemplary embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
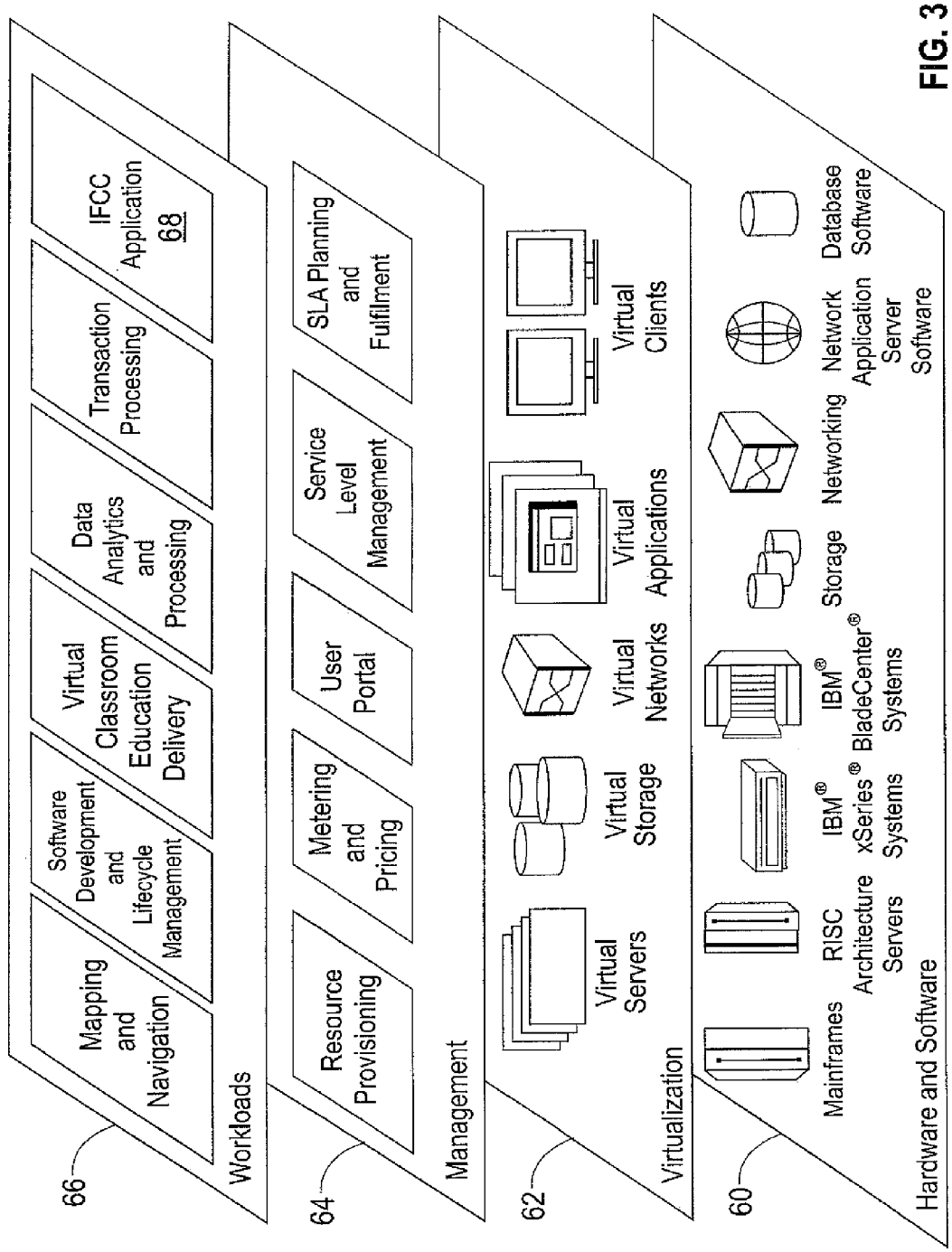
FIG. 3 depicts abstraction model layers according to an exemplary embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software 70, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and in particular, an Information Flow Control for a Cloud (IFCC) application 68.

IFCC is an architectural framework according to an exemplary embodiment of the invention. It is a modification of an IFC framework that is adapted for the cloud. IFCC enables users to share their private information with un-trusted third-party applications deployed in the cloud. The framework, in turn, prevents these applications from leaking user's sensitive content. The resulting IFCC application 68 may be hosted on an IFCC's trusted platform in the cloud. The IFCC framework may provide a complete mediation for communication to and from the application 68. Information flow control in IFCC is enforced by design. For example, the IFCC redesigns an original application to achieve effective and efficient information flow control.

Figure 4:
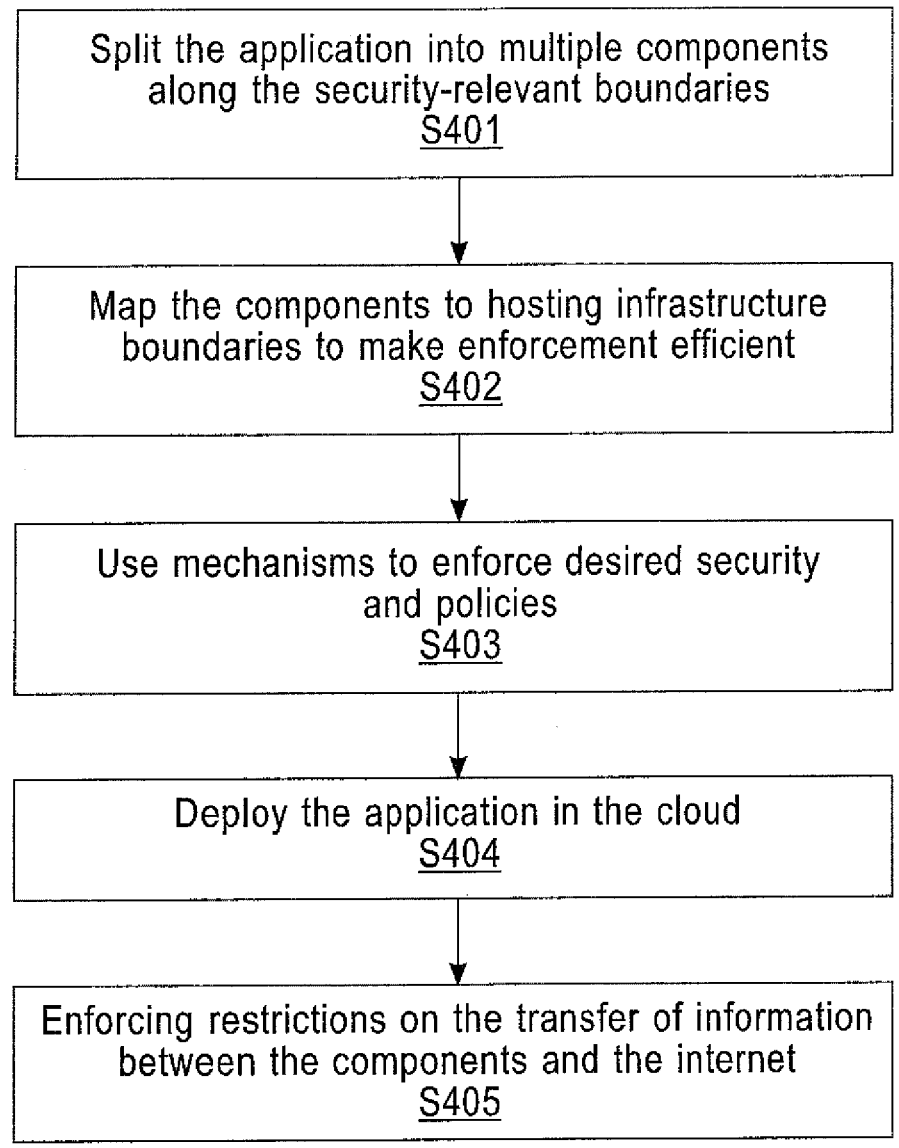
FIG. 4 illustrates a method of generating and deploying an IFCC application in the cloud according to an exemplary embodiment of the invention.

FIG. 4 illustrates a method of generating and deploying the IFCC application 68 in the cloud according to an exemplary embodiment of the invention. The method includes splitting an original application into multiple components along security-relevant boundaries (S401). A component is considered the smallest granularity of application code that can be monitored by IFCC. A component is chosen based on what information the component has access to and what external entity (or application) it is allowed to communicate with.

From an end user's perspective, the application 68 is monolithic as the user does not know about its underlying components. At the time of adding the application 68, the user may be presented with a manifest (e.g., by the cloud provider) that states what pieces of user's private information is needed by the application and which external entity will it be sharing this data with. For example, a manifest for a social networking application could specify that it does not share any information with external entities.

Figure 5:
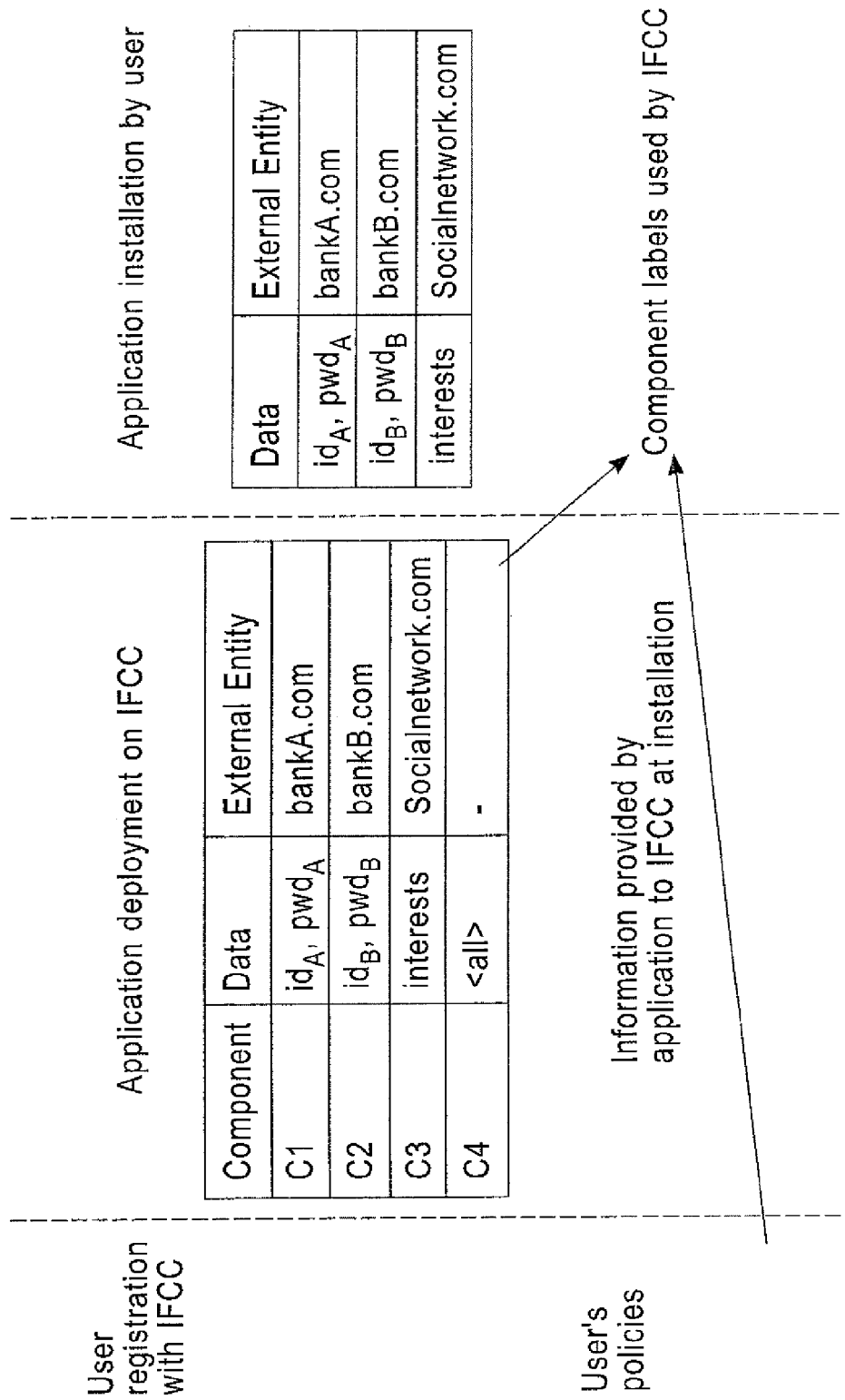
FIG. 5 illustrates a lifecycle of an exemplary IFCC application.

FIG. 5 shows an exemplary lifecycle of an IFF application 68. The user first registers with the IFCC framework by providing his privacy policies based on data types. For example, the user can specify that his telephone number should never be shared with an external entity. The developer of the IFCC application 68 decides on the structure of the components for that application and during the application's deployment on IFCC, he specifies the information required by each component and the external entity a particular component needs to communicate with.

IFCC uses this information to generate the manifest for the application. As shown in FIG. 5, a manifest is basically a specification of the application's external communications (irrespective of the components) along with the user's profile data that is shared for each communication. This manifest should be approved by the user before the application is installed for the user. Additionally, the IFCC platform ensures that all of the application's components comply with the user's privacy policies and the manifest is approved by the user. As an option, the IFCC platform can prove to the user (e.g., via a direct anonymous attestation scheme) that the configuration of the enforcement mechanism satisfies the mandatory policy specified by the user, and the application manifest is approved by the user. IFCC is developed as a service in the cloud that is deployed by the cloud provider, or as an infrastructure layer in the cloud, and hence runs with the provider's privileges and is functionally transparent to the deployed cloud applications.

Referring back to FIG. 4, the method continues by mapping the components to hosting infrastructure boundaries to make enforcement efficient (S402). For example, the application components are deployed as individual VMs on the cloud, which facilitates confinement of these components in this IFCC implementation. Any communication to and from the components occurs via the cloud network, thereby allowing all such communication to be mediated by IFCC. IFCC does not need to monitor the payload of the communication and only restricts the end-points of the communicated to pre-approved (from the manifest) parties. Each component is associated with a privilege level or label that is derived from the application's manifest. The IFCC platform mediates the information flow between the components based on these labels.

Figure 6:
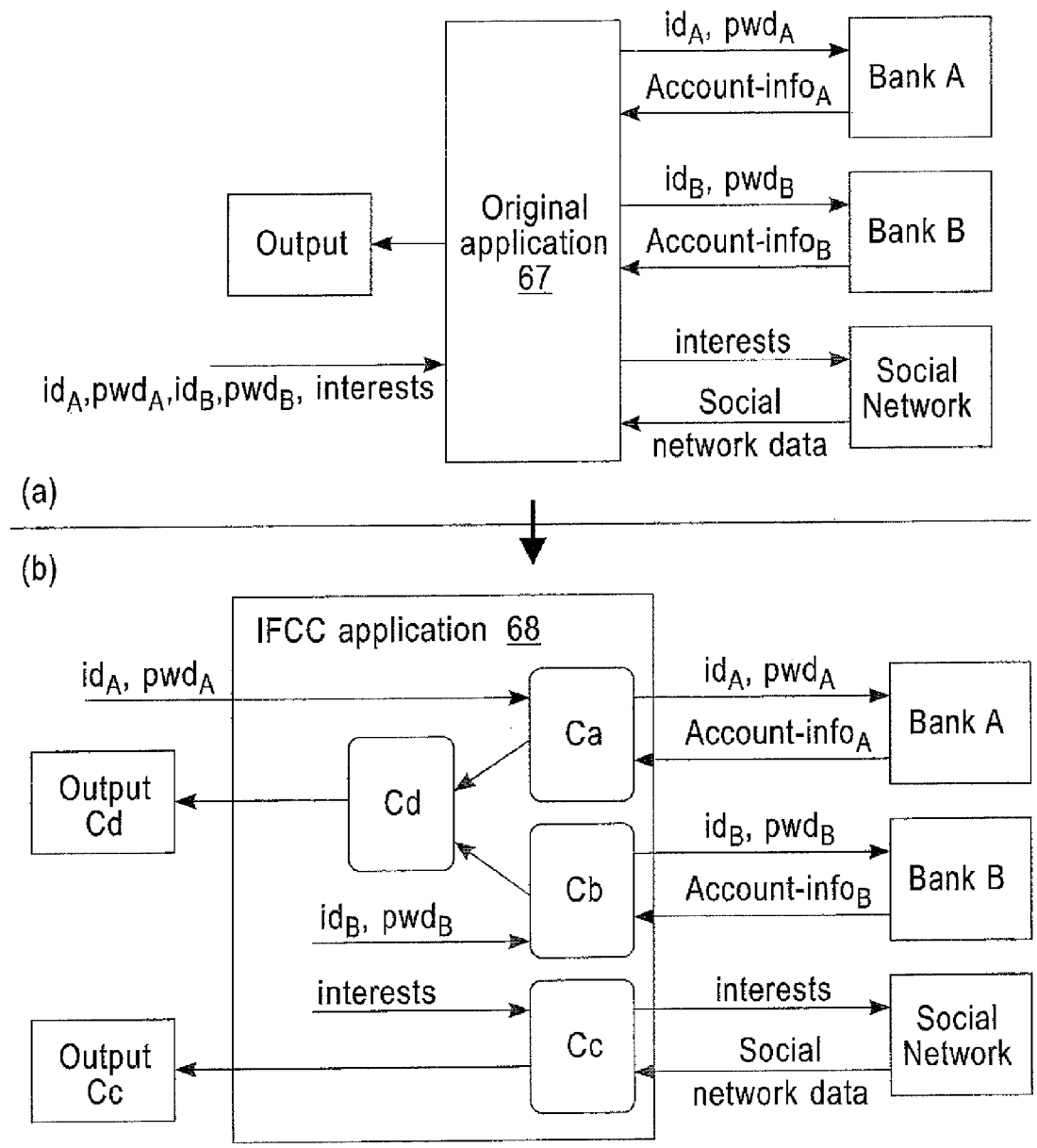
FIG. 6(a) illustrates an exemplary original application before it is converted to an IFCC application.
FIG. 6(b) illustrates the IFFCC application after it has been converted from the original application according to an exemplary embodiment of the invention.

FIG. 6A shows an original money management application 67 and FIG. 6B shows an IFCC application 68 generated from the original application 67 according to an exemplary embodiment of the invention. The division of the original application 67 into components Ca, Cb, Cc, and Cd allows the application writer to develop different functionality within an application that relies on different pieces of the user information.

In this example, the original application 67 allows its users to have a consolidated view of their bank accounts for better financial planning. Additionally, it presents interfaces to connect to social networking sites such as Facebook and Twitter, to enable users to exchange and discuss financial tips with experts and other users of these sites. Let us assume that a user adds two bank accounts, one each from Bank A and Bank B, to his profile, which is maintained by original application 67. To satisfy the user's privacy requirements, two conditions should be fulfilled: (1) Bank A and Bank B should not know each other's account information, and (2) no banking data should be shared with the social network. In the application design for current cloud environments, the application would be able to pass all information about the user, including the details of his bank accounts, to the social network (see FIG. 6A).

In the IFCC framework in an embodiment of the invention, the application 67 would be split into four components as shown in FIG. 6B to generate the IFCC application 68. Components Ca and Cb can only communicate with Bank A and Bank B respectively and have access to their respective login information (such as userid and password). Component Cc has no access to any of the banking information and interacts with the social network using the user's personal information. For example, it shares user's interests with the social network to get information on other users with similar interests. Component Cd has access to all user information, but does not communicate with any external entity. This restricted component presents a consolidated view of the two accounts by processing the information received from the two banks.

Since components Ca and Cb are given access to user's login information that is only specific to the respective target external entity, this is the only information they can communicate to these parties. Moreover, these components are restricted to communicating only with their respective target entity. As per basic information flow-control rules, information can flow from a less restricted to a more a restricted component. As a result, Ca and Cb can pass their back account information to Cd, which, in turn, processes the information to produce results that are presented to the user. Since Cd cannot communicate with any external entity, it cannot leak any information outside the IFCC framework. In addition to the security benefits provided by IFCC, its design also supports graceful degradation to partial usability for the applications. Taking the case of application 68, a user can decide not to share his credentials for Bank A by not approving that part of the manifest. This would not impact the social networking functionality of application 68 and if designed for graceful degradation, it would only partially impact the consolidated results for the user.

The method of FIG. 4 continues with using a mechanism to enforce desired security and privacy policies (S403), deploying the application 68 in the cloud (S404), and enforcing restrictions on the transfer of information between the components and external parties or the internet (S405). For example, the mechanism may be application of software-based or hardware-based firewalls to the components to prevent the components from accessing unauthorized information.

Figure 7A:
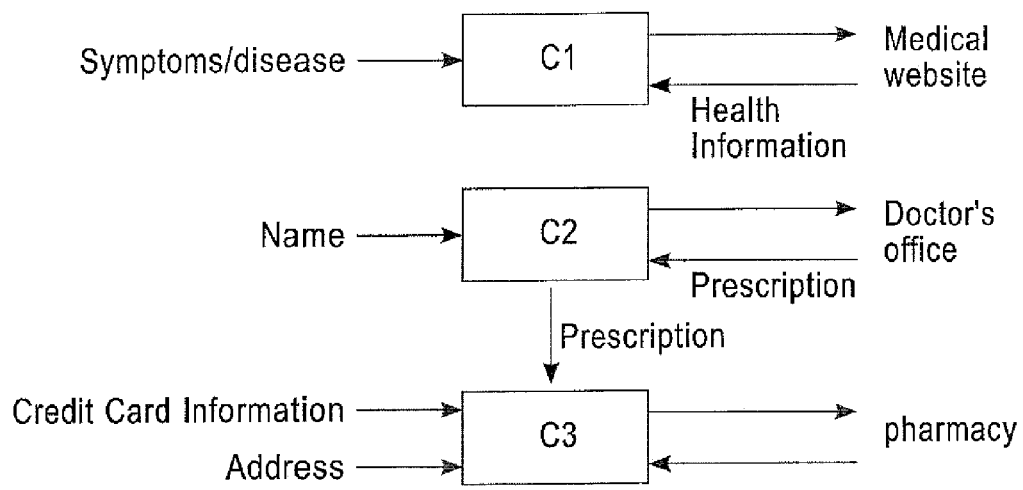
FIG. 7A illustrates splitting an exemplary original application into components of an IFCC application according to an exemplary embodiment of the invention.

FIG. 7A illustrates an example of the splitting of a medical application, wherein the splitting is illustrated in FIG. 4. In this example, the application is split up into a first component C1 for handling interactions between the user and a medical website, a second component C2 for handling interactions between the user and his doctor's office, and a third component C3 for handling interactions between the user and his pharmacy.

The first component C1 only has access to symptoms or diseases entered by the user, but not to his personal information. The first component C1 is configured to only communicate with the medical website. Thus, the first component C1 can forward the symptoms/diseases to the medical website to retrieve corresponding health information, but is incapable of sharing personal information of the user with the site.

The second component C2 only has access to the name of the user, is configured to communicate the name to a doctor's office (e.g., a website managed by the office) for retrieval of corresponding prescriptions, and to communicate with the third component C3, but only for forwarding the retrieved prescription.

The third component C3 can only receive the prescription from the second component C2, is configured to only receive the credit card information and address from the user, and is allowed to output the prescription, credit card information, and address to the pharmacy (e.g., a website managed by the pharmacy), but not the information about the user's symptoms.

Although not shown in FIG. 7A, an additional routing component may be present to ensure that data only suitable for the proper component ever be routed thereto. For example, the routing component can intercept data entered by the user, discern its type (e.g., symptom, name, credit card number, address, etc.), and then route the data according to its discerned type to all components with permission to receive such data.

Figure 7B:
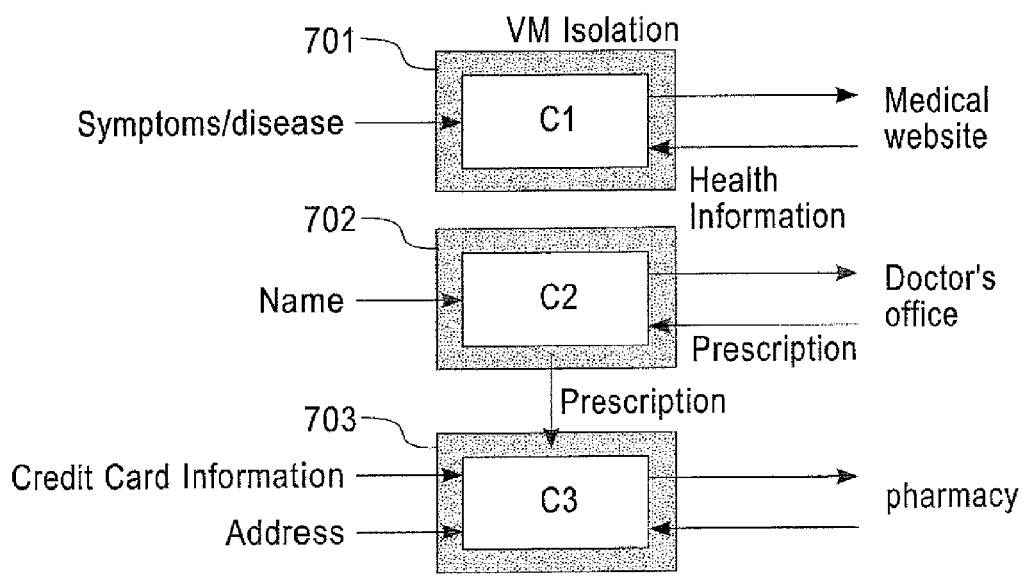
FIG. 7B illustrates mapping of the components onto virtual machines according to an exemplary embodiment of the invention.

FIG. 7B illustrates an example of the mapping illustrated in FIG. 4. As shown in FIG. 7B, each of the components C1, C2, and C3 is mapped to its own virtual machine (VM). For example, component C1 is mapped to a first virtual machine 701, component C2 is mapped to a second virtual machine 702, and component C3 is mapped to a third virtual machine 703.

Figure 7C:
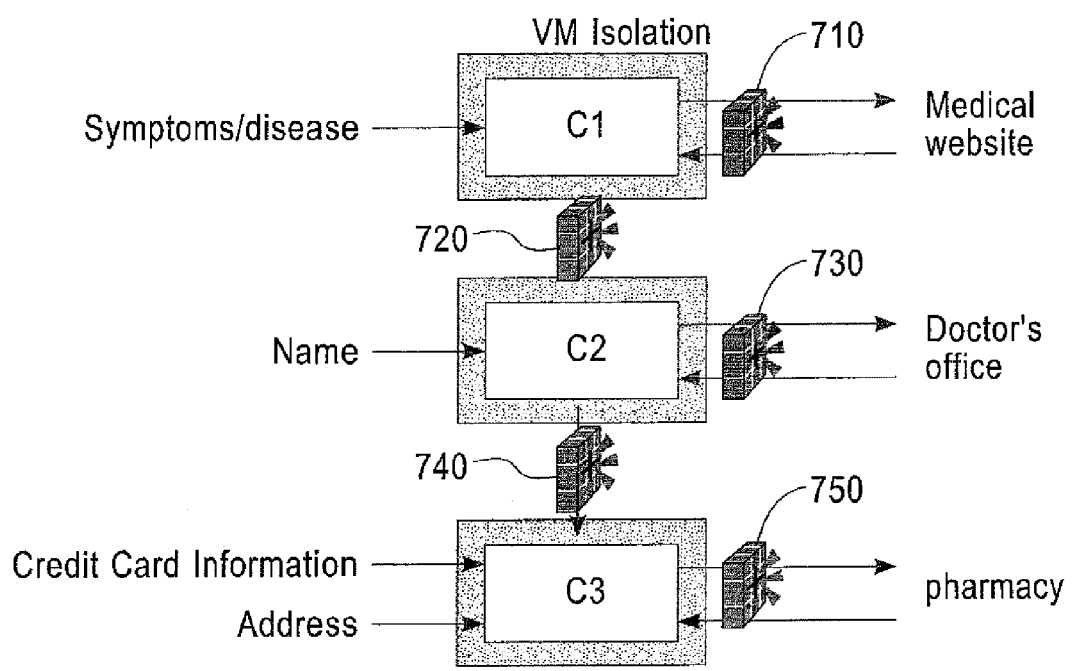
FIG. 7C illustrates an example of a mechanism that can be used to enforce a desired privacy policy according to an exemplary embodiment of the invention.

FIG. 7C illustrates an example of the use of a mechanism to enforce desired security and privacy policies as illustrated block S403 of FIG. 4. As shown in FIG. 7C, several firewalls 710-750 are created. For example, a first firewall 710 is created between the first component C1 and the medical website, a second firewall 720 is created between the first component and the second component C2, a third firewall 730 is created between the second component C2 and the Doctor's Office, a fourth firewall 740 is created between the second component C2 and the third component C3, and a fifth firewall 750 is created between the third component C3 and the pharmacy. The firewalls may be software-based or hardware-based and are used to help keep communication between parties on either side of the wall secure.

The above described routing component can also be a firewall. A firewall can control the incoming and outgoing network traffic by analyzing the data packets and determining whether it should be allowed through or not based on a predetermined rule set. The rule set can be stored in a database (e.g., see database software in 60 of FIG. 3). The below Table 1 illustrates an exemplary rule set that can be used to handle the above described interactions between the user, the components, and the parties (e.g., medical website, doctor's office, pharmacy).

TABLE 1

| Firewall | Communicates with | Blocks Communication with | Information Passed |
|---|---|---|---|
| 510 | Medical Website | X | Symptoms/diseases/health information |
| 520 | X | C2 | X |
| 530 | Doctor's Office | X | Name/prescription |
| 540 | C2 and C3 | X | prescription |
| 550 | Pharmacy | X | Credit card information,/address/prescription |

The rule set is derived from the manifest of the IFCC application 68 and a privacy policy of the user. The manifest is a data set (e.g., computer data structure) that specifies the data requirements of the various parties that the application 68 interfaces with and the privacy policy is a data set that indicates what information the user is willing to share and with which party he is willing to share such information. These datasets are dynamic.

For example if the medical website now needs the name of the user, the medical website can send a computer message to the first virtual machine 710 that it now needs the user's name. The first virtual machine 710 can then update the manifest to list that the medical website needs the "name" of the user and request permission from the user to authorize output of his name to that website. If the user authorizes this request, then the first virtual machine 710 updates the privacy policy of the user to indicate that his name can be communicated with the medical website. The VM 710 then updates the rule set as shown below in Table 2 to show that the name of the user can be passed to the Medical Website.

TABLE 2

| Firewall | Communicates with | Blocks Communication with | Information Passed |
|---|---|---|---|
| 510 | Medical Website | X | Symptoms/diseases/health information/Name |
| 520 | X | C2 | x |
| 530 | Doctor's Office | X | Name/prescription |
| 540 | C2 and C3 | X | prescription |
| 550 | Pharmacy | X | Credit card information,/ address/prescription |

If the user does not authorize the request, the user's ability to continue receiving information from the medical website will depend on the medical website. For example, the medical website could decide that no information will be sent to the user unless they additionally provide their name, or the site could give the user limited access to information until the user agrees to provide his name.

The user is allowed to review and update his current privacy policy at any time to adjust what information is allowed to be sent each party. For example, if the user decides at a later time that he should not be sharing his name with the site, the user can request that the application 68 update his privacy policy to prevent access of his name with the site. The application 68 would then update the rule-set so it appears like Table 1, and again the user's name would be prevented from being shared with the medical website.

The review allows the user to determine what is going to happen to his data after he enters it into the cloud application 68 before any data is actually uploaded to the cloud. In an operational terms, for an infrastructure cloud, this determination translates to discerning which VMs and remote services receive the data (or parts of it) once it is supplied to a given entry-point.

Once the application 68 is deployed in the cloud (e.g., see block S404), the cloud provider can use remote attestation to assure the user that the execution environment is enforcing their privacy policy (e.g., see block S405). The user can request an attestation from the cloud that his privacy policies are actually being enforced.

While the above includes discussions of medical and money management applications, embodiments of the invention may be applied to any type of application. One of the goals of at least one embodiment of the invention is to require minimum changes from the cloud users, application developers, or cloud providers. For cloud users, the only change is the need to attach a privacy policy to their data. For application providers, the change means that the application has to be structured into components along security-relevant boundaries, instead of strict functionality boundaries. For cloud providers, the changes may be more involved, as will be discussed below.

In at least one embodiment of the invention, the TFCC framework is built from IBM's Trusted Virtual Datacenter (TVDc) technology. TVDc provides an enhanced security solution that guarantees stronger isolation and integrity, and facilitates easier management of VMs in virtualized cloud environments. The isolation policy abstracts the physical infrastructure and allows for automated policy driven configuration management of resources, such as platform access and network connection. The TVDc isolation policy is coarse-grained because its unit is the Trusted Virtual Domain (TVD), which is defined as the set of VMs and associated resources that serve a common purpose. The boundaries of a TVD are defined by labeling all VMs and associated resources within the TVD with a unique TVD identifier known as a security label.

IFCC requires isolation between application components, which can be achieved by placing each component into VMs belonging to a different TVD. All communication to and from the components should follow the information flow control rules and the rules defined by the manifest. The label for each component can be derived based on the manifest and the user's privacy policies (see e.g., FIG. 5). This label is associated with the TVD encapsulating the component. While the mandatory policies for a typical TVDc allow free communication between VMs within a TVD, they completely isolate the VMs belonging to different TVDs. The complete isolation between TVDs does not satisfy the requirements of IFCC, where the isolation policies are determined by the information flow control rules. For example, one-way communication is desired from component Ca to Cd in our representative example (e.g., see FIG. 6(b). However, in an exemplary embodiment of the invention, the TVDc's policy model is customized to open up communication between the TVDs based on the information flow control rules. Since TDVc's isolation model relies on the TVD labels, one can achieve the required enforcement by customizing the definition of such labels.

Note that above disclosure discusses use of an infrastructure cloud as the underlying layer. This facilitates easier understanding as the mechanisms are presented using lower layer semantics, such as VMs. However, similar concepts apply to the platform cloud as well, as the IFCC framework can be deployed as an extension to the cloud platform. The platform provides the required isolation and network mediation that, in turn, enables IFCC to enforce its information flow control policies. Thus, embodiments of the invention are compatible with the infrastructure and platform clouds.

In an exemplary embodiment of the invention, when the application 68 is deployed in the cloud, it is associated with a licensing agreement that the user must agree to before it uses the cloud-hosted application. The text of this licensing agreement follows a strict structure corresponding to the software components that make up the application 68. This structure defines disjoint subsections of the licensing agreement text, such that each subsection captures the licensing terms related to one and only one software component. Each component has a corresponding subsection, and the structure of the licensing agreement is machine readable such that the licensing agreement can be automatically processed and transformed using natural language processing (NLP) tools.

Thus, a custom licensing agreement can be constructed for each user, based on their privacy policy and preferences. In other words, when the user specifies the external parties that are allowed to access user data, the hosting provider will reconfigure the application components appropriately (e.g, disable some, enable others, constrain their communication). Then a custom licensing agreement is presented to the user before access to the customized application is enabled. The licensing agreement is customized automatically (with the help of NLP tools) to (1) exclude irrelevant subsections (i.e., subsections that correspond to application components that are disabled) and (2) describe only the limited communication between the enabled components.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system configured to convert an original application into a distributed application comprising a plurality of application components, the system comprising:
a memory storing a computer program; and
a processor configured to execute the computer program, wherein the program is configured to:
generate a manifest comprising an entry for each application component indicating a part of private information of the user the application component is entitled to access, and either indicating i) a website the application component is permitted to share the information with or ii) that the application component is not to permitted to share the information,
split the original application into the plurality of application components along security relevant boundaries according to the manifest by generating a second computer program for each entry that only has access to the part of the private information of the entry and the website of the entry, and a third computer program that has access to all the private information, no access to the websites, and is configured to process data received from the second computer programs,
map the application components to hosting infrastructure boundaries, and
use a mechanism to enforce a privacy policy of the user and the manifest.

2. The system of claim 1, wherein the program performs the split by parsing computer code of the original application for boundary program labels that define respective boundaries of each application component within the original application, and generating a distinct process for each boundary program label.

3. The system of claim 1, wherein the program performs the map by mapping each application component to a distinct virtual machine.

4. The system of claim 1, wherein the mechanism used by the program is assignment of a firewall between at least two of the application components.

5. The system of claim 1, wherein the mechanism used by the program is assignment of a firewall between at least one of the application components and at least one external application.

6. The system of claim 1, wherein the program is configured to deploy the application in a cloud.

7. The system of claim 6, wherein the program deploys the application by starting each application component in its own virtual machine.

8. The system of claim 1, wherein the program associates a licensing agreement that the user must agree to before it uses the application.

9. The system of claim 8, wherein the licensing agreement includes a distinct section for each application component present in the application.

10. The system of claim 8, wherein a structure of the licensing agreement is machine readable such that the licensing agreement is readable by a natural language processing tools.

11. The system of claim 8, wherein the program presents the licensing agreement to the user before enabling the user access to the application.

12. A system configured to manage a distributed application comprising a plurality of application components, the system comprising:
    a memory storing a computer program; and
    a processor configured to execute the program,
    wherein the program is configured to start a new virtual machine for each application component,
    wherein each virtual machine runs a distinct one of the application components,
    wherein a first application component of the application components is configured to communicate first private information of a user to a first website according to a manifest, send a message to the user requesting permission for the first website to access second other private information of the user, update the manifest based on a response of the user to the message, and output the second private information to the website only when the manifest indicates that output of the second private information to the website is allowed,
    wherein a second application component of the application components is configured to communicate the second private information to a second website, and
    wherein a third application component of the application components has access to all the private information, no access to the websites, and is configured to process data received from the first and second application components.

13. The system of claim 12, wherein at least one of the application components generates at least one rule for a firewall based on a privacy policy and information requirements of the external application.

14. The system of claim 12, where the message includes a licensing agreement having a distinct section for each application component.

* * * * *